(12) United States Patent
Kobayashi et al.

(10) Patent No.: US 6,682,808 B2
(45) Date of Patent: Jan. 27, 2004

(54) CROSSLINKED LAMINATED WRAP FILM AND DISPENSER BOX THEREFOR

(75) Inventors: Hisaaki Kobayashi, Mie (JP); Takashi Nakao, Mie (JP); Masahide Yoshimoto, Mie (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 69 days.

(21) Appl. No.: 10/125,401

(22) Filed: Apr. 19, 2002

(65) Prior Publication Data

US 2003/0138584 A1 Jul. 24, 2003

Related U.S. Application Data

(60) Provisional application No. 60/284,885, filed on Apr. 20, 2001.

(51) Int. Cl.[7] ............. B32B 7/02; B32B 27/32; B26D 1/02
(52) U.S. Cl. ............. 428/213; 225/48; 225/49; 225/50; 428/220; 428/515; 428/516; 428/523
(58) Field of Search ............. 225/48, 49, 50; 428/213, 219, 220, 516, 515, 523

(56) References Cited

U.S. PATENT DOCUMENTS

| | | | | |
|---|---|---|---|---|
| 4,899,918 A | * | 2/1990 | Oketani et al. | 225/43 |
| 5,766,772 A | * | 6/1998 | Ciocca et al. | 428/516 |
| 5,962,092 A | * | 10/1999 | Kuo et al. | 428/34.9 |

FOREIGN PATENT DOCUMENTS

| | | |
|---|---|---|
| JP | 11-286087 A | 10/1999 |
| JP | 2000-127315 A | 5/2000 |

\* cited by examiner

*Primary Examiner*—D. S. Nakarani
(74) *Attorney, Agent, or Firm*—Birch, Stewart, Kolasch & Birch, LLP

(57) ABSTRACT

The present invention relates to wrap films, especially wrap films for food. More specifically, the present invention pertains to crosslinked laminated polyethylene wrap films which are excellent in adhesion, pulling-out ease from a dispenser box and heat resistance, does not emit much odor, permits preferable food wrapping and can be produced efficiently.

20 Claims, 2 Drawing Sheets

CROSSLINKED LAMINATED WRAP FILM AND DISPENSER BOX THEREFOR

This application claims the benefit of Provisional Application No. 60/284,885, filed Apr. 20, 2001.

FIELD OF THE INVENTION

The present invention relates to films for packaging of food or articles, particularly to wrap films for food. More specifically, the invention pertains to crosslinked laminated polyethylene wrap films excellent in adhesion, pulling-out ease from a dispenser box and heat resistance, emits little odor, can wrap food suitably and have good production efficiency.

BACKGROUND OF THE INVENTION

Wrap films for food are used mainly at home as a convenient packaging material for food and most of them serve to protect food. Such wrap films are required to have adhesion between a container and the film or between the films high enough not to cause peeling by itself. They are also required to have heat resistance durable to the use in a microwave oven, elastic touch, resilience, good appearance when wrapped with the film, hygienic and low odor emission. Most of such wrap films are placed in a dispenser box as a film roll so that low power for pulling out from a dispenser box, low power for cutting and stable propagation property are required at the same time. In addition, efficient production is important for providing good quality and inexpensive wrap films.

The above-described adhesion is necessary for preventing a film, with which food or a container having food therein has been wrapped, from peeling by itself, thereby coming the food or container in contact with dust or another article (food). The pulling-out power, on the other hand, must be sufficiently low in order to provide users with handling ease. Lack of either one of them lowers the function as a wrap film so that it is necessary to satisfy these two performances simultaneously.

In order to maintain satisfactory appearance of a wrapped article, bubbling as described in Japanese Patent Laid-Open No. 286087/1999 must be suppressed. This bubbling is a phenomenon of air bubbles, which have been formed by boiling of water contained in the wrapped article during heating in a microwave oven, remaining on the surface of the wrap film even after heating. The bubbling deteriorates the appearance of the wrapped article. More specifically, water contained in the article wrapped by the film evaporates during heating, adheres to the film and becomes dew drops. These dew drops are boiled into air bubbles. The surface tension of these air bubbles is increased by a surfactant added to the film so that air bubbles remain even after heating.

To satisfy the above-described performances, various improvements of a polyethylene film have been made in a known manner. For example, proposed for imparting a wrap film with necessary adhesion are a process of adding an ethylene.vinyl acetate copolymer or tackifier to its surface layer resin, and a process of using a ultra-low density polyethylene or linear low density polyethylene which is viscous and contains a large amount of a low-molecular-weight component. Known are a process of adding a lubricant such as polyhydric alcohol fatty acid ester to lower the pulling-out power, a process of adding a high density polyethylene to impart the film with resilience and elasticity and a process of carrying out crosslinking treatment in order to impart the film with heat resistance. Moreover, a technique of a higher level has been developed to satisfy the balance between the above-described properties necessary for a wrap film by using these techniques in combination. For example, as a film other than a wrap film, Japanese Patent Publication No. 21930/1993 proposes an ethylene-based crosslinked film having layers different in the content of a polyhydric alcohol fatty acid ester, whereby layers constituting the film are different each other in the crosslinking degree. Here, the polyhydric alcohol fatty acid ester is used as a crosslinking controlling agent. As a wrap film, Japanese Patent Laid-open No. 25355/1998 discloses a wrap film made of a metallocene-based ethylene copolymer, Japanese Patent Laid-Open No. 286087/1999 discloses a crosslinked laminated film obtained by adding a glycerin trifatty acid ester to each of the surface layers containing a linear low density polyethylene and the intermediate layer containing a high density polyethylene. U.S. Pat. Nos. 5,019,315 and 5,248,547 disclose stretched wrap films each having a linear low density polyethylene as a surface layer and a high pressure process low density polyethylene as an intermediate layer; and preparation processes thereof.

The techniques however involve the below-described drawbacks. The film described in Japanese Patent Publication No. 21930/1993 is accompanied with the drawback that it contains a large amount of a polyhydric alcohol fatty acid ester having also a function as a surfactant so that air bubbles remain on the film surface when heated in a microwave oven. The laminated film according to Japanese Patent Laid-Open No. 255355/1998 contains a metallocene-based polymer so that it has high tear strength and is inferior in cutting property. The films disclosed in U.S. Pat. Nos. 5,019,315 and 5,248,547 have poor heat resistance, and owing to a high proportion of a high pressure process low density polyethylene in the whole film, has lowered elasticity (resilience and elasticity). Japanese Patent Laid-Open No. 286087/1999 discloses a wrap film added with a glycerin trifatty acid ester in order to improve adhesion, pulling-out property, cutting property and heat resistance. Upon crosslinking a coextruded parison and stretching the resulting parison by a double bubble method, contamination resulting from a glycerin trifatty acid ester is generated much on a pinch roller rightly downstream of the second bubble and is deposited on a film, thereby deteriorating the product (which will hereinafter be called film contamination). In order to prevent it, production is interrupted and contamination is removed frequently from a roller, which worsens production efficiency and leads to a cost increase.

As described above, a polyhydric alcohol fatty acid ester or glycerin trifatty acid ester added to prepare a film having a good quality causes unexpected problems such as deterioration in the appearance of a wrapped article or generation of film contamination.

Another problem exists in the balance of the performances of the film. When an increase of adhesion is intended, pulling-out power becomes higher. When lowering of the pulling-out power is intended, on the other hand, the adhesion lowers. An increase in the modulus of elasticity, which is an index of elasticity or resilience, inevitably worsens stretching property. Thus, it is very difficult to maintain the balance between these properties.

With regards to cutting property, optimization of the combination of a material or constitution of a film and a cutter has hardly been conducted.

SUMMARY OF THE INVENTION

An object of the invention is to overcome the above-described problems and to provide a crosslinked laminated polyethylene wrap film which is excellent in adhesion, pulling-out ease from a dispenser box, cutting ease, heat resistance, emission of odor from the film and touch feel, has less film contamination upon preparation of the film, does not leave air bubbles after heating in a microwave oven and is capable of wrapping food suitably.

Another object of the invention is to provide a dispenser box suitable for having the wrap film disposed therein.

Other objects and effects of the invention will become apparent from the following description.

The above-described objects of the invention have been achieved by providing a crosslinked laminated wrap film having, at least, two surface layers and one intermediate layer, wherein the two surface layers each comprising 20 to 90% by weight of a linear low density polyethylene and 80 to 10% by weight of a high pressure process low density polyethylene, wherein the intermediate layer has at least one layer comprising 50 to 95% by weight of a high density polyethylene and 50 to 5% by weight of a high pressure process low density polyethylene, wherein the surface layers and the intermediate layer each has 0.050 to 0.800 part by weight of a glycerin monofatty acid ester based on 100 parts by weight in total of the two polyethylenes constituting the respective layer.

The invention differs from the conventional techniques in the following points: according to the conventional techniques, various ethylene (copolymers are used for wrap films and in some cases, a polyhydric alcohol fatty acid ester is added in a large amount, while in the crosslinked laminated wrap film according to the invention, the two surface layers each comprises 20 to 90% by weight of a linear low density polyethylene and 80 to 10% by weight of a high pressure process low density polyethylene; the intermediate layer comprises 50 to 95% by weight of a high density polyethylene and 50 to 5% by weight of a high pressure process low density polyethylene; and each of these three layers has 0.050 to 0.800 part by weight of a glycerin monofatty acid ester based on 100 parts by weight in total of the two polyethylenes constituting the respective layer.

The role of the constituent elements of the invention differing from the conventional techniques is to impart a crosslinked laminated polyethylene wrap film with excellent adhesion, pulling-out ease a dispenser box, cutting ease, good touch feel with elasticity, excellent heat resistance and low odor emission property. In addition, it features high resilience in a dispenser box, free from air bubbles, good appearance of an article wrapped with the film and little film contamination upon film formation.

Figure 1:
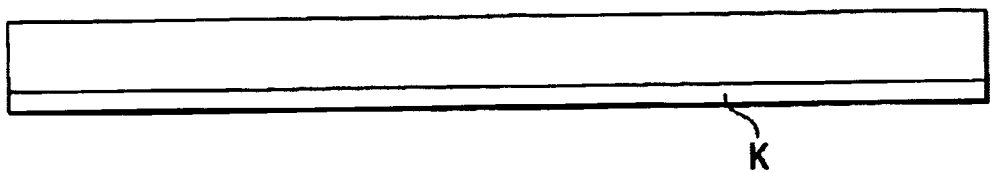
FIG. 1 is a schematic view illustrating a linear cutter of the invention.

Reference numerals in these drawings are as follows:
1: Front plate
2: Bottom plate
3: Rear plate
4: Top plate
5: Cover strip
6: Ridgeline between top plate and cover strip
8: Lateral plate
11: Lateral cover strip
13: Film box
K: Cutter portion
L: Ridgeline between front plate and bottom plate
R: Film roll
F: Film
A,D: Endmost portions of cutter
B,C: Points of inflection from the central portion toward the end portion of the cutter

DETAILED DESCRIPTION OF THE INVENTION

The invention will be described in more detail below.

The linear low density polyethylene of the invention is an ethylene.α-olefin copolymer having ethylene units as a principal component and having no long-chain branch. The density thereof is preferably 0.900 to 0.929 g/cm$^3$, more preferably 0.905 to 0.920 g/cm$^3$. Densities less than 0.900 g/cm$^3$ may deteriorate pulling-out property owing to excessive adhesion, while those exceeding 0.929 g/cm$^3$ may deteriorate adhesion of a film.

The linear low density polyethylene for use in the invention can usually be prepared in a known manner, for example, gas phase fluidized bed process, gas phase agitation bed process, liquid phase slurry process, liquid phase solution process or high pressure reactor process. More specifically, for example, a process of copolymerizing ethylene and α-olefin in a gas phase or in a solution phase at low temperature and low pressure in the presence of a transition metal catalyst can be exemplified. Examples of the catalyst include Ziegler catalysts, Phillips catalysts and metallocene catalysts. Of these, Ziegler catalysts are preferred because they may permit a moderate increase of adhesion because of a large amount of low-molecular-weight components in a polymer. As the α-olefin, at least one selected from C$_{3-18}$ olefins such as butene-1, pentene-1, hexene-1, 4-methylpentene-1, and octene-1 can be used, of which butene-1, hexene-1 and octene-1 are more preferred. The above-described catalysts or linear low density polyethylenes different in constituting components may be used in combination.

The high pressure process low density polyethylene of the invention is an ethylene (copolymer having a long chain branch. The density thereof is preferably 0.910 to 0.939 g/cm$^3$, more preferably 0.920 to 0.929 g/cm$^3$. Densities less than 0.910 g/cm$^3$ may lower the elasticity of a film (resilience and elasticity), while at densities exceeding 0.939 g/cm$^3_1$ although not so much power is necessary to pulling out the film, but the adhesion may be insufficient.

The high pressure process low density polyethylene for use in the invention can be prepared in a known manner. It is usually prepared by polymerizing ethylene at a temperature of 100 to 300° C. under a pressure of 100 to 350 MPA in the presence of a free radical generator such as peroxide in an autoclave or tube reactor.

The high density polyethylene of the invention is an ethylene homopolymer or a copolymer of ethylene and α-olefin. It can be prepared in a known manner such as Phillips process, standard process or Ziegler process. The density thereof is preferably 0.940 to 0.975 g/cm$^3$, more preferably 0.945 to 0.965 g/cm$^3$. Densities less than 0.940 g/cm³ may lower the elasticity (resilience and elasticity) of the film, while at densities exceeding 0.975 g/cm³, stretching upon production may be hardly effected.

Density measurements of each of the linear low density polyethylene, high pressure process low density polyethylene and high density polyethylene of the invention are in accordance with JIS K6760 (1995 edition) With regards to the mixing ratio of the linear low density polyethylene and high pressure process low density polyethylene constituting the two surface layers of the invention, the amount of the linear low density polyethylene is 20 to 90% by weight, and the amount of the high pressure process low density polyethylene is 80 to 10% by weight. Preferably the amount of the linear low density polyethylene is 30 to 80% by weight, and the amount of the high pressure process low density polyethylene is 70 to 20% by weight. More preferably, the amount of the linear low density polyethylene is 30 to 70% by weight, and the amount of the high pressure process low density polyethylene is 70 to 30% by weight. When the amount of the linear low density polyethylene is less than 20% by weight, the low-molecular-weight content in the polymer lowers, leading to insufficient adhesion, though the pulling out power is reduced. When the amount of the linear low density polyethylene exceeds 90% by weight, on the other hand, the adhesion becomes excessive and much power is necessary to pulling out the film, making it difficult to pulling out the film. The mixing ratio may be different between these two surface layers, but the mixing ratio is preferably the same in consideration of the balance of the adhesion of the two surface layers.

With regards to the mixing ratio of the high density polyethylene and high pressure process low density polyethylene constituting the intermediate layer of the invention, the amount of the high density polyethylene is 50 to 95% by weight, and the amount of the high pressure process low density polyethylene is 50 to 5% by weight in order to impart the film with moderately high elasticity (resilience and elasticity) and facilitate stretching upon production. More preferably, the amount of the high density polyethylene is 65 to 85% by weight, and the amount of the high pressure process low density polyethylene is 35 to 15% by weight. The reason therefor is as follows. Amounts of the high density polyethylene less than 50% by weight lower the elasticity of the film, thereby deteriorating its touch feel, while those exceeding 95% by weight excessively increase the elasticity, making the stretching processing difficult upon production or deteriorating the touch feel.

The crosslinked laminated wrap film of the invention comprises at least three layers including two surface layers and at least one intermediate layer. The intermediate layer is interposed between the two surface layers. The number of the intermediate layer is preferably 1 to 3, more preferably 1. This is because when the number exceeds 3, each layer should be made too thin because of too large number of the layers, making it difficult to control the film thickness.

The glycerin monofatty acid ester of the invention is added to smoothen the stretching step upon film production which will be described later. It is necessary to simultaneously suppress bubbling after heating in a microwave oven and film contamination upon production. The glycerin monofatty acid ester comprises glycerin and a monoester of a $C_{2-22}$ fatty acid. Examples of the fatty acid ester include saturated fatty acid esters such as acetic acid ester, caproic acid ester, caprylic acid ester, capric acid ester, lauric acid ester, myristic acid ester, palmitic acid ester and stearic acid ester; and unsaturated fatty acid esters such as caproleic acid esters, lauroleic acid esters, myristoleic acid esters, palmitoleic acid esters, oleic acid esters and erucic acid esters. Of these, fatty acid esters derived from a $C_{6-20}$ fatty acid are preferred, of which $C_{18}$ stearic acid esters and oleic acid esters are preferred, with oleic acid esters being more preferred. Fatty acid esters having less than 6 carbon atoms may emit a pungent odor, while fatty acid esters having carbon atoms exceeding 20 may provide an adverse affect on the balance between the adhesion and the pulling-out property. Use of stearic acid esters lowers odor emission, while when an oleic acid ester is used, odor emission is lowered and, at the same time, excellent compatibility with polyethylene is brought about.

The content of the glycerin monofatty acid esters of the invention must be small in order to suppress bubbling. The content of the glycerin monofatty acid ester in the overall film layer and each layer is 0.050 to 0.800 part by weight, preferably 0.050 to 0.500 part by weight, more preferably 0.100 to 0.300 part by weight, each based on 100 part by weight, in total, of two polyethylenes constituting each layer. At contents less than 0.050 part by weight, the film is broken at a deflator in a stretching step and such a trouble lowers production efficiency. At contents exceeding 0.800 part by weight, on the other hand, air bubbles remain even after heating in a microwave oven. Upon film production, the amount of the glycerin monofatty acid ester to be added to the resin may be set appropriately so that the final product has the content as specified in the invention in consideration of that is may be modified during the production or it may transfer onto the surface of the film. The difference in the content of the glycerin monofatty acid ester between any two layers among the two surface layers and intermediate layer is preferably 0 to 0.300 part by weight, more preferably 0 to 0.100 part by weight, still more preferably 0 to 0.010 part by weight in order to prevent a change in physical properties due to interlayer transfer of the glycerin monofatty acid ester. It is most preferred that the content is the same.

The H.L.B. (Hydrophile Lipophile Balance) of the glycerin monofatty acid ester of the invention is one of the important factors relating to bubbling, which however depends on the balance with its content which will be described later. The H.L.B. of the glycerin monofatty acid is usually 1 to 8, preferably 3 to 6, more preferably 4 to 5. When the H.L.B. is less than 1, it may adversely affect the adhesion. H.L.B. exceeding 8, on the other hand, improves hydrophilicity, possibly leading to frequent occurrence of bubbling.

H.L.B. is an indicator representing a ratio of hydrophilicity to lypophilicity. It is calculated from the molecular structure of a compound, and greater H.L.B. indicates more improved hydrophilicity. In the invention, H.L.B. is calculated by, among various calculation methods, the Atlas method represented by the below-described equation (1) which method is readily utilized for the calculation of H.L.B. of an ester nonionic surfactant.

$$H.L.B.=20(1-S/A) \tag{1}$$

wherein, S represents a saponification number of a polyhydric alcohol ester and A represents a neutralization number of a raw material fatty acid.

This H.L.B. is an important factor influencing on bubbling, depending on the content of the ester. Use of glycerin trifatty acid ester having a low H.L.B. is known as one of the countermeasures for suppressing bubbling. As described above, however, use of a glycerin trifatty acid ester leads to frequent occurrence of film contamination upon film production so that it is necessary to replace it with a glycerin monofatty acid ester rather free from film contamination. Incorporation of a large amount of this glycerin monofatty acid ester in a film causes repeated occurrence of bubbling owing to a high H.L.B. value so that it is necessary to suppress its content to not greater than 0.800 part by weight.

Qualitative analysis and quantitative analysis (or determination of a content ratio) of the glycerin monofatty acid ester in the overall wrap film layer and each layer in the invention can be carried out in a known manner. The qualitative analysis is conducted by extracting a film with hot methanol, fractionating the extract by column chromatography, fractionating further by GPC, identifying the glycerin fatty acid ester of thus fractionated sample by NMR, saponifying and methyl esterifying the ester and identifying the sample by gas chromatography. Quantitative analysis is on the other hand conducted by extracting the film with hot methanol, trimethylsilylating (conversion into TMS) the extract and then determining by gas chromatography. For the qualitative analysis and quantitative analysis (or the determination of a content ratio) of the glycerin monofatty acid ester in each layer, infrared microspectrometry may be used in combination.

An adhesion work volume of the crosslinked laminated wrap film of the invention is an index for evaluating the adhesion between films or the adhesion of the film with a container when the container or food is covered with the wrap film. As described above, the adhesion is a property of a wrap film as important as the pulling-out property. The adhesion work volume is a workload for peeling two adhered films which can be measured as described later. When the adhesion work volume is less than 0.50 mJ, the film may peel off by itself owing to low adhesion, while at an adhesion work volume exceeding 3.50 mJ, the adhesion may become excessive, making handling difficult. The adhesion work volume is preferably within a range of 0.50 to 3.50 mJ, more preferably 0.80 to 3.00 mJ, still more preferably 1.00 to 2.00 mJ.

This adhesion work volume can be adjusted to a desired value, for example, by the mixing ratio of the linear low density polyethylene and the high pressure process low density polyethylene in the surface layers. In some cases, it can be adjusted by the density of the linear low density polyethylene.

The pulling-out power of the crosslinked laminated wrap film of the invention is an important property of the wrap film as well as the adhesion. The pulling-out power is to evaluate pulling-out easiness of film F from film roll R in a dispenser box. The pulling-out power is measured by a method as described later. Pulling-out powers less than 50 mN may deteriorate handling easiness owing to excessively low pulling-out power, while pulling-out powers exceeding 1000 mN may deteriorate handling easiness owing to difficulty in pulling-out the film. The pulling-out power is preferably within a range of 50 to 1000 mN, more preferably 50 to 700 mN, still more preferably 50 to 500 mN.

The pulling-out power can be adjusted to a desired value, for example, by a mixing ratio of the linear low density polyethylene and the high pressure process low density polyethylene in the surface layers. In some cases, it can be adjusted by the density of the linear low density polyethylene, the modulus of elasticity of the film or the overall film thickness.

The above-described adhesion work volume and pulling-out power are both indispensable factors for a wrap film to provide good and comfortable handling use.

The laminated wrap film of the invention must be crosslinked because it should be heat resistant to permit its use under high temperature conditions in a microwave oven. The crosslinking can be conducted in a known manner. Examples thereof include a crosslinking method of adding a crosslinking agent, heating the mixture to a temperature of its decomposition temperature, thereby subjecting it to crosslinking; and a method by exposing it to energy beams. They may be used in combination. Examples of the energy beams used for the energy beams irradiation method include ultraviolet rays, electron beams, X rays, $\alpha$ rays, $\beta$ rays, $\gamma$ rays and neutron radiation. The exposure to electron beams is preferred. Exposure to electron beams may be conducted, for example, by subjecting a parison or whole film to electron beams at an energy voltage of 100 kV to 1 MV.

The gel fraction of the crosslinked laminated wrap film of the invention is used as an index for the crosslinked degree of the film and it is measured by a method as described later. The gel fraction of the parison or overall film is preferably 20 to 70% by weight, more preferably 20 to 50% by weight. When the gel fraction is less than 20% by weight, the film may have poor heat resistance, while gel fractions exceeding 70% by weight may make the stretching processing difficult upon film production. The gel fraction is measured in accordance with ASTM-D2765 and it is a weight fraction of an insoluble content after immersion in boiling paraxylene for 12 hours.

The crosslinked laminated wrap film of the invention can be produced in a known process. The production process has, for example, a lamination step, stretching (film formation) step and taking-up step. If necessary, treatment such as exposure to energy beams or heat setting can be further added. More specifically, the lamination is carried out, for example, by dry lamination, extrusion lamination or co-extrusion. Co-extrusion is preferred because an equipment therefor is simple. The stretching step can be carried out, for example, by a casting method wherein a molten resin is taken using a cooling roller, a double bubble process wherein a molten resin tube is solidified by cooling and then stretched under application of heat, a direct inflation process wherein air is directly blown into a molten resin tube to cause stretching, a sequential tenter biaxial stretching process wherein machine stretching by a roll followed by tenter cross stretching. Of these, biaxial stretching processes are preferred because they impart the resulting film with good cutting property, with sequential tenter biaxial stretching and double bubble processes being more preferred, and double bubble process being still more preferred. The taking-up step is a step of taking up a thus-stretched film and forming a film original. If necessary, the energy beams irradiation may be carried out with respect to a parison or a stretched film, and the heat setting may be carried out with respect to a stretched film.

The production of the crosslinked laminated wrap film by using the double bubble process is conducted, for example, as follows. The resins constituting each layer of the wrap film is molten by an extruder of each layer, followed by co-extrusion through a multilayer circular die (e.g., cyclic three-layer die). The resulting co-extruded molten resin forms a first bubble rightly after extrusion from the die and is then cooled and solidified, into a parison, by a liquid medium or the like. This parison is crosslinked by exposure to energy beams such as electron beams. Then, the crosslinked parison is heated while passing through a heating furnace having a maintained atmospheric temperature of at least the melting points of the resins constituting the surface layers and the intermediate layer. Air is blown inside of the parison to form a second bubble, followed by biaxial stretching. This bubble is flattened by a pinch roller while air is removed by a deflator, and is then taken up after heat setting if necessary. The atmospheric temperature in the heating furnace is preferably set at 130 to 190° C. for facilitating stretching. The glycerin monofatty acid ester of the invention is necessary for smooth passage of a stretched bubble in an air-removing deflator for the second bubble. The above-described roller contamination appears on the pinch roller just downstream of the deflator.

The overall film thickness of the crosslinked laminated wrap film of the invention is measured in accordance with ASTM E-252 and is preferably 5 to 25 μm, more preferably 5 to 15 μm in order to attain good touch feel and handling ease as a wrap film. When the thickness is less than 5 μm, the film may tend to be broken because of the thinness, while when the thickness exceeds 25 μm, the cutting property of the film may be deteriorated.

It is preferred for imparting the film with a sufficient modulus of elasticity that the ratio of the total thickness of the surface layers relative to the overall film thickness is 70 to 10% and the thickness ratio of the intermediate layer is 30 to 90%, as measured by a method which will be described later. Thickness ratios of the intermediate layer less than 30% may deteriorate the modulus of elasticity of the film, thereby deteriorating its touch feel. Those exceeding 90% on the other hand may make it difficult to prepare a film because the thickness of the two surface layers cannot be readily controlled. The two surface layers preferably have the same thickness in order to prevent curling of the film.

The thickness ratio of each layer can be calculated based on the thickness of each layer. When a parison is to be measured, the measurement method includes a method where the cross-section of the parison is observed by an optical microscope. When a film is measured, on the other hand, the measurement method include a method where the thickness is measured by shrinking the film in an atmosphere of 140° C., cutting it into segments by a microtome and then observing the cross-section thereof by an optical microscope.

The overall film thickness or each layer thickness can be adjusted to a desired value by discharge amounts from extruders for respective layers upon production, their ratio, line velocity or stretching ratio.

The stretching ratio of the crosslinked laminated wrap film in the invention in terms of an area ratio is preferably 5 to 70 times, more preferably 20 to 60 times in order to impart the film with good cutting property. Stretching ratios less than 5 may deteriorate the cutting property, while those exceeding 70 may increase a dimensional change of the product.

A modulus in tension is an index of resilience or elasticity of a film and for the crosslinked laminated wrap film of the invention, a sufficient modulus in tension is necessary in order to satisfy good touch feel and appearance of a wrapped article. When the modulus in tension is less than 300 MPa, the resulting film may have insufficient resilience or elasticity. When it exceeds 700 MPa, on the other hand, the resulting film may become rough and gives odd touch feel. The modulus in tension therefore preferably falls within a range of 300 to 700 MPa, more preferably 400 to 600 MPa. The measurement is carried out in accordance with ASTM D-882 under the conditions of a stress rate of 5 mm/min, initial sample length (distance between chucks) of 100 mm and sample width of 10 mm. It is calculated from the stress upon 2% elongation.

This modulus in tension can be adjusted to a desired value, for example, by the mixing ratio of the linear low density polyethylene and high pressure process low density polyethylene in the surface layer or the mixing ratio of the high density polyethylene and the high pressure process low density polyethylene in the intermediate layer. In some cases, it can be adjusted by the density of each resin or the stretching ratio.

The heat shrinkage ratio of the crosslinked laminated wrap film of the invention must be low in order to prevent deformation of a wrapped substance due to a marked shrinkage of the film upon use under high temperature in a microwave oven. The heat shrinkage ratio of the film is preferably 0 to 30%, more preferably 0 to 10% upon heat treatment at 100° C., because heat shrinkage ratios exceeding 30% may deform the wrapped substance due to shrinkage of the film upon use at high temperatures. The measurement is conducted in accordance with ASTM D-1204 (1984 edition) under conditions of heat treatment at 100° C. for 1 minute, This heat shrinkage ratio can be adjusted to a desired value by the density of each resin, stretching ratio or stretching temperature.

Figure 2:
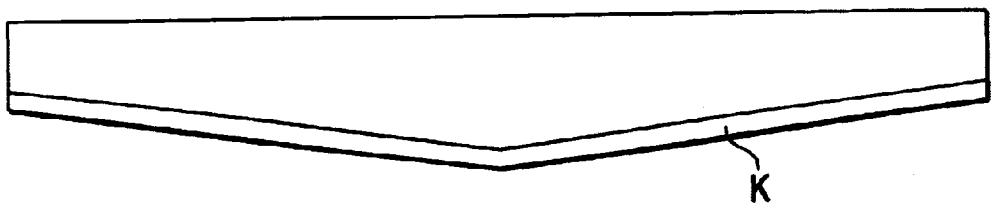
FIG. 2 is a schematic view illustrating a V-shaped cutter of the invention.
Figure 3:
FIG. 3 is a schematic view illustrating a reverse V-shaped cutter of the invention.
Figure 4:
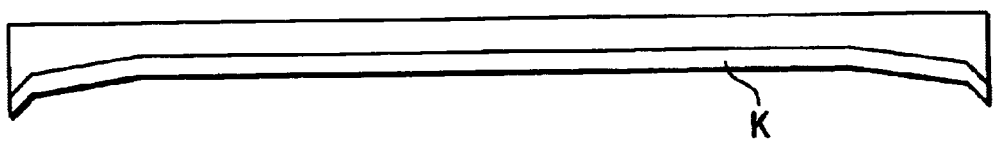
FIG. 4 is a schematic view illustrating an arched cutter of the invention.

The cutter of the present invention is a tool for cutting a film, and those of various shapes or various materials can be used. Cutters have a size sufficiently small to be attached to a dispenser box and have, at a cutting portion K, a continuously serrated blade facilitating light cutting. Examples of the shape of the cutter include linear shape (FIG. 1), V-shape (FIG. 2), inverted V-shape (FIG. 3) and arched shape (FIG. 4). Of these, the arched cutter is preferred, because it permits lighter cutting of a film. Examples of the material of the cutter include polymer materials, e.g., aliphatic ester polymers such as lactic acid polymers, ester polymers such as aromatic ester polymers, ethylene polymers, propylene polymers, styrene polymers and amide polymers, and further include vulcanized paper, resin-impregnated hardened paper, abrasive, abrasive-bonded paper and metals. Of these, lactic acid polymers, which can be recycled and are therefore environmentally friendly, and metals requiring low cutting power are preferred.

The arched cutter is a cutter as described in Japanese Utility Model Laid-Open No. 138130/1990 or Japanese Patent Laid-Open No. 6961/2000. The arched cutter is a cutter in which its central portion thereof in the longitudinal direction is linear, the cutter gradually inclines to a direction of a bottom line of the box sequentially toward both ends of the cutter, and the both endmost portions protrude toward the bottom line direction of the box by 2 to 15 mm relative to the central portion. Described specifically, the cutter at the central portion thereof (a virtual line connecting between blade edges if the cutter has been serrated (which will hereinafter be called "virtual line")) is linear. The cutter has a combination of plural curves or straight lines (of virtual lines) which show a slow inclination in the bottom line direction as they (virtual lines) approach toward the both ends of the cutting portion K from inflection points B and C which are at both ends in the longitudinal direction of the central linear portion. In addition, the cutter protrudes, at the endmost portions A and D, by 2 to 15 mm from the central portion of the blade edge toward the bottom line direction.

Figure 5:
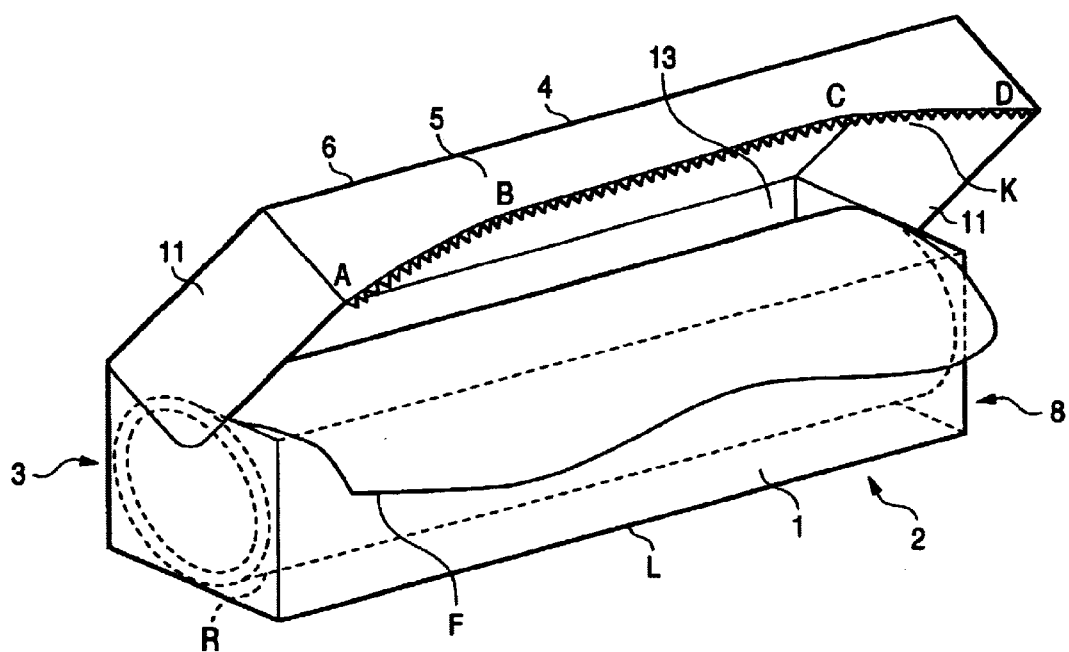
FIG. 5 is a perspective view illustrating a dispenser box equipped with an arched cutter.

The dispenser box of the invention having the crosslinked laminated film disposed therein is, for example, a dispenser box as illustrated in FIG. 5 made of a rectangular film box 13 defined by the wall surfaces of front plate 1, bottom plate 2, rear plate 3 and lateral plates 8 and having, at the top of the box, an opening; and top plate 4 which is disposed in connection with the upper edge of rear plate 3 so as to cover film box 13 from the upper edge of rear plate 3, and is defined by the wall surfaces of cover strip 5 extending from the front edge of top plate 4 in such a direction as to cover front plate 1 and lateral cover strips 11 disposed at both ends of cover strip 5. No particular limitation is imposed on the installing position of the cutter insofar as it permits easy cutting of the film. Disposal at the front edge of cover strip 5 is preferred. The dispenser box is preferably designed so that film roll R does not pop up when film F is pulled out from film roll R placed in the dispenser box. The dispenser box preferably has a height of 44 to 54 mm, depth of 44 to 54 mm and length of 153 to 313 mm, which size facilitates grasping with one hand.

The material for the dispenser box includes, for example, plastic, corrugated cardboard or paperboard. The paperboard is preferred for its handling use. The paperboard has a thickness of about 0.35 to 1.50 mm, and a more rigid and stronger box is available by the use of a thicker paperboard. However, too thicker paperboard has difficulty in bending, and therefore thickness within 0.35 to 0.80 mm is preferred.

The cutting property of the crosslinked laminated wrap film of the invention is evaluated from two viewpoints, that is, the tear strength of the film and the maximum cutting power when the film is cut by the cutter. A film pulled out from the dispenser box is cut, by the cutter, into a desired size for covering a container or food. At this time, the tear strength indicates tear strength and tear propagation of the film itself, while the maximum cutting power indicates (initial) power necessary for cutting of the film by the cutter.

The term "tear strength" as used herein means a tear strength in a transverse direction of a wrap film as measured in accordance with ASTM D-1922. The tear strength is preferably 0.1 to 140.0 mN, more preferably 0.5 to 100 mN. At tear strength less than 0.1 mN, the film may be broken suddenly, while at tear strength exceeding 140.0 mN, the film cannot be cut easily and an excessive large power is required for cutting. This tear strength can be adjusted to a desired value by changing the stretching ratio upon film production, the mixing ratio of the resins constituting respective layers, the density of each resin, MI, the overall film thickness or thickness or the thickness of each layer.

The term "maximum cutting power" as used herein means the maximum load when the film is cut while it is pulled out from the dispenser box equipped with the cutter. This power will be measured by a method as described later. The maximum cutting power is preferably 0.2 to 10.0 N, more preferably 1.0 to 4.0 N. At the maximum power less than 0.2 N, the film may be cut suddenly, while the maximum power exceeding 10.0 N may prevent film from being cut owing to high cutting power. The maximum cutting power can be adjusted to a desired value by adjustment methods of the above-described tear strength or by changing a cutter.

The MI (melt index) of each of the linear low density polyethylene, high pressure process low density polyethylene and high density polyethylene according to the invention is preferably 0.1 to 10.0 g/10 min, more preferably 0.1 to 3.9 g/10 min in order to prepare the film efficiently. When MI is less than 0.1 g/10 min, a larger power is sometimes required for cutting due to strengthened entanglement of molecular chains, or foreign matters such as decomposed products may frequently appear in the extrusion step of the resin. When MI exceeds 10.0 g/10 min, on the other hand, the film may be broken easily (broken suddenly) because a decrease in the entanglement of molecular chains prevents smooth orientation, or the resin may be excessively softened upon heating in a stretching step of the film, making it difficult to perform stretching. The MI is measured in accordance with JIS K6760 (1995 edition).

An ordinarily employed additive such as antioxidant may be added to each layer of the crosslinked laminated wrap film of the invention within an extent not impairing the advantages of the invention.

In the invention, each resin and glycerin monofatty acid ester can be mixed in a known manner, for example, dry blending, Banbury mixer or kneading in an extruder.

EXAMPLES

The present invention will be illustrated in greater detail with reference to the following Examples and Comparative Examples, but the invention should not be construed as being limited thereto.

The resins and additives used in Examples and Comparative Examples, and film production and evaluation methods are as described below:

(A) Resins

The resins used in Examples and Comparative Examples are as described below. Their density and MI (melt index) are measured in accordance with JIS K6760 (1995 edition). The unit of the density is g/cm$^3$, while that of MI is g/10 min. Abbreviations are similar to those used in Tables.

(A-1) Linear Low Density Polyethylene (LLDPE)

| Abbreviation | Trade name | Maker | Density | MI |
|---|---|---|---|---|
| LL1 | Attane 4201 | Dow Chemical Japan | 0.912 | 1.0 |
| LL2 | Sumikathene Hi-α FW201-O | Sumitomo Chemical | 0.913 | 2.0 |
| LL3 | Moretec 0238CN | Idemitsu Petrochemical | 0.916 | 2.1 |
| LL4 | Umerit 1520F | Ube Industries | 0.913 | 2.2 |

(A-2) High Pressure Process Low Density Polyethylene (LDPE)

| Abbreviation | Trade name | Maker | Density | MI |
|---|---|---|---|---|
| LD1 | Petrothene 186R | TOSOH | 0.924 | 3.0 |
| LD2 | Petrothene 6K02A | TOSOH | 0.925 | 0.3 |
| LD3 | Suntec LD M2004 | Asahi Kasei | 0.920 | 0.4 |

(A-3) High Density Polyethylene (HDPE)

| Abbreviation | Trade name | Maker | Density | MI |
|---|---|---|---|---|
| HD1 | Suntec HD S360 | Asahi Kasei | 0.954 | 1.1 |
| HD2 | Moretec 0408G | Idemitsu Petrochemical | 0.962 | 3.8 |
| HD3 | Nipolon Hard 2500 | TOSOH | 0.961 | 8.0 |
| HD4 | Nipolon Hard 2000 | TOSOH | 0.959 | 15 |

(B) Additives

The additives used in Examples and Comparative Examples are as described below. Each additive is a product of Riken Vitamin Co., Ltd. Abbreviations are similar to those used in tables. The amount of an additive used in Examples and Comparative Examples is based on 100 parts by weight of the total of the two polyethylenes constituting each of the surface layers and intermediate layer.

(B-1) Glycerin Monofatty Acid Ester (Rikemal OL-100E) H.L.B. value=4.3

| Abbreviation | Content of glycerin monofatty acid ester (in total amount) | Content of Glycerin monooleate (in total amount) |
|---|---|---|
| GMO | 98% by weight | 73.5% by weight |

(B-2) Glycerin Trifatty Acid Ester (Acter LO-1)

| Abbreviation | Content of glycerin trifatty acid ester (in total amount) | Content of glycerin trioleate (in total amount) |
|---|---|---|
| GTO | 100% by weight | 95% by weight |

(C) Film Production Process

The crosslinked laminated wrap film in each of Examples and Comparative Examples was prepared in the following manner.

A mixture containing predetermined amounts of a linear low density polyethylene and a high pressure process low density polyethylene was fed to an extruder for surface layers (two surface layers), while a mixture containing predetermined amounts of a high density polyethylene and a high pressure process low density polyethylene was fed to an extruder for an intermediate layer and the mixtures were each mixed under molten state while a predetermined amount of an additive was poured via an injection pump into each of the extruders. The resulting resin mixtures were fed to a cyclic three-layer die, followed by lamination and co-extrusion in the die at an average resin temperature of 240° C. Rightly downstream of this cyclic three-layer die, the molten resin discharged from the die was quenched by cooling water of 15° C. while forming a first bubble. Then the resin was pinched by a pinch roller to yield a planar parison. The parison was adjusted to have a desired surface layer/intermediate layer/surface layer thickness ratio. The parison was found to have a thickness of 400±50 µm. The flattened parison was crosslinked by using an electron beam irradiator having an accelerating voltage of 750 kV. The crosslinking degree at that time was adjusted so that the gel fraction of the overall layer would be 35±15%. The parison thus crosslinked was heated in a heating furnace maintained at an atmospheric temperature of 170° C. While air was blown into the parison to form a second bubble, it was biaxially stretched at a stretching ratio of 6×6. After the thus stretched film was allowed to pass through a deflator, it was flattened by a pinch roller (the position where film contamination was evaluated) and was wound up by a take-up. Thus, a film original was prepared. Then, this film original was cut at both ends and peeled into two films. Then, they were each cut further into a film of 30 cm wide and taken up as a wind-up roll. The film was then wound up, under tension of 50 mN per 1 cm wider from the wind-up roll to a cylindrical paper tube having an outer diameter of 41 mm and length of 308 mm, whereby a film roll R was formed. The thickness of the overall film layer was found to be 10.5±0.5 µm as a result of measurement after storage in an atmosphere of 28° C. for 7 to 14 days.

(D) Evaluation Method

Evaluation methods employed in Examples and Comparative Examples are as described below. Films stored for 7 to 14 days at 28° C. after preparation were employed as samples (except those for evaluating film contamination, thickness of each layer and stretching ratio).

(1) Adhesion Work Volume (Adhesion)

Film-to-film adhesion when a container such as dish or food was covered with a wrap film was evaluated and measurement was conducted in the following manner.

Columns having a bottom area of 25 cm$^2$ and a weight of 400 g were prepared. To each of their bottom surfaces, a filter paper having the same area therewith was adhered in advance. At each of the bottom surfaces to which the filter paper had been adhered, a wrap film was fixed under tension so as to avoid wrinkles from appearing in the film. After these two columns were fitted closely with their film surfaces inside and adhered, a weight of 500 g was applied, followed by contact bonding for 1 minute. After a predetermined time, the weight was removed. Rightly after removal, the films overlapped were separated in a direction vertical to the surface at a rate of 5 mm/min by a tensile tester and energy (mJ) generated at this time was designated as adhesion work volume. Measurement was conducted in an atmosphere of 23° C. The test was repeated 10 times and an average value was adopted. The adhesion work volume was evaluated on a 4-point scale.

| Evaluation Criteria | | Remarks |
|---|---|---|
| A | 1.00 mJ or greater but not greater than 2.00 mJ | Adhesion work volume is optimum. Much excellent adhesion. |
| B | 0.80 mJ or greater but less than 1.00 mJ | Film does not peel by itself. Free from excessive adhesion |
| | Greater than 2.00 mJ but not greater than 3.00 mJ | Excellent adhesion |
| C | 0.50 mJ or greater but less than 0.80 mJ | Self-peeling hardly occurs. Almost free from excessive adhesion |
| | Greater than 3.00 mJ but not greater than 3.50 mJ | No problem in adhesion in practical use |
| D | Less than 0.50 mJ Greater than 3.50 mJ | Self-peeling occurs. Excessive Adhesion. Having a problem in adhesion in practical use. |

(2) Pulling-Out Power (Pulling-Out Property)

Pulling-out ease of Film F from Film roll R was evaluated in the following manner.

In the first place, Film roll R wound around a cylindrical paper tube was fixed at the lower part of a tensile tester, while being sandwiched by jigs for exclusive use. As these jigs, those having a structure capable of sandwiching and fixing therebetween both ends of the paper tube of the film roll R and rotating the fixed portions of the paper tube under a light load were employed. The end portion of the film was adhered to and fixed at an upper fixing tool of 330 mm wide and a power available upon unwinding the film at a rate of 1000 mm/min in an atmosphere of 23° C. was measured.

The maximum load at this time was designated as a pulling-out power. This test was conducted 10 times and an average value was adopted. Pulling-out power was evaluated on a 4-point scale.

| Evaluation Criteria | | Remarks |
|---|---|---|
| A | 50 mN or greater but not greater than 500 mN | Having optimum pulling-out power Much excellent in pulling-out property Excellent handling ease |
| B | Greater than 500 mN but not Greater than 700 mN | Film can be pulled out without problems Excellent in pulling-out property and therefore easy to handle. |
| C | Greater than 700 mN but not Greater than 1000 mN | For pulling-out of film, some power is required. No problem in pulling-out property in practical use |
| D | Less than 50 mN Greater than 1000 mN | Film is pulled out with no resistance, which brings about odd feeling. A large power is necessary for pulling out. In practical use, problems sometime appear in pulling-out property or handling ease. |

(3) Cutting Property

The cutting property was evaluated using the below-described tear strength and maximum cutting power.

(a) Tear Strength

Here, tear propagation of a film torn from its notched portion was evaluated and tear strength in the transverse direction of the wrap film was measured in accordance with ASTM D-1922. Tear strength was evaluated on a 3-point scale,

| Evaluation Criteria | | Remarks |
|---|---|---|
| B | 1.0 mN or greater but not greater than 50.0 mN | Optimum resistance against tear propagation. No influence on cutting property. |
| C | 0.5 mN or greater but less than 1.0 mN Greater than 50.0 mN but not greater than 100.0 mN | Sufficient resistance against tear propagation. Almost no influence on cutting property. |
| CD | 0.1 mN or greater but less than 0.5 mN Greater than 100.0 mN but not greater than 140.0 mN | A little inferior in resistance against tear propagation Sometimes a little influence on cutting property. |
| D | Less than 0.1 mN Greater than 140.0 mN | Insufficient resistance against tear propagation Sometimes influence on cutting property. |

(b) Maximum Cutting Power

The maximum cutting power was measured in the below-described manner by evaluating cutting property brought by the combination of a film and a cutter.

Film roll R of 300 mm wide and 20 m long, which had been wound around a paper tube, was placed in a dispenser box as illustrated in FIG. 5. A sufficient amount of Film F was taken out and allowed to pass between cover strip 5 and front plate 1, whereby film F was sandwiched between the cutter and front plate 1. This dispenser box was fixed onto a box-like platform connected with load measuring instrument (force gauge) and all the sides other than front plate 1 were fixed. The angle of the cutter disposed at a predetermined position, which would be described later, was set at 15° in the horizontal plane relative to the pulling-out direction of the film and at 30° relative to the horizontal surface in the direction opposite to the pulling-out direction of the film, whereby the cutting portion K turned downward. Under this state, the edge portion of film F was stretched at an accelerated velocity of 2.2 m/sec$^2$ until film F was cut completely. The maximum load detected at that time by the force gauge was designated as the maximum cutting power. The test was conducted 10 times and an average was adopted.

The cutter employed here was made of a tin plate (scratching rough finish, temper DR-8, thickness 0.17 mm (JIS G3303)). The length of the cutter in the longitudinal direction was set at 304 mm. A serrated blade had isosceles triangles having a height of 0.50 mm and an apex angle of 60°. Between any adjacent two of the serrations, a flat portion was disposed and its length was 0.5 mm. The cutter was installed at the front edge of cover strip 5 and the distance between a linear virtual line connecting top of the serrations at the central portion of cutting portion K and ridgeline L between front plate 1 and bottom plate 2 was set at 18.0 mm. As the cutter, linear (FIG. 1) and arched (FIG. 4) ones not different in the shape of serrations were employed. In the arched cutter, the length of the virtual line at the central portion was 150 mm and blade edges at edges A and D was positioned at 15.0 mm downward from the virtual line at the central portion.

As the dispenser box, employed was a rectangular box as illustrated in FIG. 5 made of a film box 13 of 46 mm high, 46 mm wide and 311 mm long defined by the wall surfaces of front plate 1, bottom plate 2, rear plate 3 and lateral plates 8 and having, at the top of the box, an opening; and a lid body defined by the wall surfaces of an openable or closable top plate 4 which is disposed in connection with the upper edge of rear plate 3 so as to cover film box 13, cover strip 5 extending in such a direction as to cover front plate 1 from the front edge of top plate 4, and lateral cover strips 11. The dispenser box made of a paperboard and having a thickness of 0.55 mm was used.

Maximum cutting power was evaluated on a 3-point scale.

| Evaluation Criteria | | Remarks |
|---|---|---|
| B | 1.0 N or greater but not greater than 4.0 | Maximum cutting power is optimum. Film can be cut comfortably and cutting property is excellent. |
| C | 0.2 or greater but less than 1.0 N Greater than 4.0 but not greater than 10.0 | Maximum cutting power is sufficient. Film can be cut without particular problems. |
| D | Less than 0.2 N Greater than 10.0 N | Cutting property is not sufficient. Film cannot always be cut smoothly. |

(4) Modulus in Tension

Test was carried out in accordance with ASTM D-882. Measurement conditions were as follows: stress rate of 5 mm/min, initial sample length (distance between chucks) of 100 mm and sample width of 10 mm. It is calculated from the stress upon 2% elongation. Modulus in tension was evaluated on a 3-point scale.

| Evaluation Criteria | | Remarks |
|---|---|---|
| B | 400 MPa or greater but not greater than 600 MPa | Modulus in tension is optimum. Excellent in tension, toughness and touch. |
| C | 300 MPa or greater but less than 400 MPa | Modulus in tension is sufficient. No problems in tension, toughness |

-continued

| Evaluation | Criteria | Remarks |
|---|---|---|
| | Greater than 600 MPa but not greater than 700 MPa | and touch in practical use. |
| D | Less than 300 MPa Greater than 700 MPa | Modulus in tension is insufficient. Infedor in tension, toughness and touch. |

(5) Heat Shrinkage Ratio

A heat shrinkage ratio was measured in accordance with ASTM D-1204 (1984 edition) First, a film of 120 mm×120 mm was marked at three points with a distance of 5 cm in the machine direction, then at two points 5 cm apart from each of the first three points in the transverse direction. The resulting film was heat treated for 1 minute in an oven maintained at 100° C. After the film was taken out from the oven, a length between any two adjacent points was measured. Based on the measurement results, a heat shrinkage ratio was calculated. It was evaluated on a 3-point scale.

| Evaluation | Criteria | Remarks |
|---|---|---|
| B | Not greater than 10% | Heat shrinkage ratio is very low. Free from influence on the wrapped article when used at high temperatures. |
| C | Greater than 10% but not greater than 30% | Heat shrinkage ratio is low. Almost free from influence on the wrapped article when used at high temperatures. |
| D | Greater than 30% | Heat shrinkage ratio is high. Use at high temperatures sometimes has an influence on the wrapped article. |

(6) Heat Resistance

Heat resistance was evaluated as described below in accordance with Wrap Quality Labeling Standards (Tominhyo No. 29) based on Tokyo Consumer Life Ordinance, Article 11.

A wrap film was cut into a piece of 3 cm wide×14 cm long and at each of the upper and lower ends on both sides of the film, a strip of Itamegami, a kind of paper formed of several sheets pasted together, having a size of 3 cm wide×2.5 cm long was adhered by a double-faced tape so that the film did not protrude from the paper. It was used as a sample. A weight of 10 g was hung from the lower end of the sample by using a clip. The upper end was fixed by a jig in an oven maintained at predetermined temperature. One hour later, it was confirmed whether the film was cut or not. When the film was cut, measurement was conducted again at the temperature of the oven decreased by 5° C. When the film was not cut, on the other hand, measurement was conducted again at the temperature of the oven increased by 5° C. The maximum temperature at which the sample was not but was designated as a heat resistant temperature. Heat resistance was evaluated on a 3-point scale.

| Evaluation | Criteria | Remarks |
|---|---|---|
| B | 140° C. or greater | Having excellent heat resistance. Sufficiently usable in a microwave oven. |
| C | 110° C. or greater but less than 140° C. | No problem in heat resistance. Usable in a microwave oven. |
| D | Less than 110° C. | Having inferior heat resistance. Difficult to use in a microwave oven. |

(7) Odor of Film

By the method as described below, the odor of a film is evaluated. A panel of 10 experts was asked to smell the odor of a film. An average of scores according to evaluation on a 3-point scale was found.

| Scores | Criteria |
|---|---|
| 1 | Film does not emit an odor. |
| 2 | Film hardly emits an odor. |
| 3 | Film emits a slight odor. |
| 4 | Film has some odor. |
| 5 | Film emits an odor. |

Based on the average, the odor of a film was evaluated as described below on a 3-point scale.

| Evaluation | Criteria | Remarks |
|---|---|---|
| B | Less than 2.5 | Odor of film is markedly small. |
| C | 2.5 or greater but less than 3.5 | Film sometimes emits odor. |
| D | 3.5 or greater | Film emits odor. |

(8) Film Contamination

Film contamination was evaluated as described below by visually observing the existence of foreign matters attached, during film production, onto a roller or onto a film after passage through the roller.

The roller used for evaluation was a pinch roller disposed just downstream of a deflator after biaxial stretching in the film production step. Existence of foreign matters attached onto the roller 12 hours after the beginning of preparation and those attached onto the film rightly after it passed through the roller were visually evaluated. Film contamination was evaluated on a 3-point scale.

| Evaluation | Criteria | Remarks |
|---|---|---|
| B | Absence of both film contamination and roller contamination | No influence on production. |
| C | Existence of roller contamination but absence of roller contamination | Almost no influence on production. |
| D | Existence of both roller contamination and film contamination | Sometimes having an influence on production. Sometimes worsening production efficiency. |

(9) Bubbling

Evaluated was whether bubbling occurred or not on the surface of a film when an article wrapped with the film was heated in a microwave oven.

To a cup having an inner diameter of 5.5 cm and a depth of 7.5 cm, 100 cc of tap water was poured, followed by heating in a microwave oven ("SANYO EMO-SR1 (S)

500W, product of Sanyo Electric) for 1 minute. The film-wrapped cup during heating and 10 seconds after the cup was taken out from the microwave oven was observed. If bubbles, like suds, having a diameter of 1 to 10 mm existed on the surface of the film, the film was judged not free from bubbling.

| Evaluation Criteria | | Remarks |
|---|---|---|
| B | Bubbling occurred neither during heating nor after heating | There exists no problem in the appearance of wrapped article before and after heating. |
| C | Bubbling occurred during heating but not after heating | An influence exists on the appearance during heating but not in the appearance of wrapped article after heating. |
| D | Bubbling occurred during and after heating. | An influence exists on the appearance of wrapped article before and after heating. |

(10) Overall Film Thickness

Overall film thickness was measured in accordance with ASTM E-252 by using "TECLOCK US-26" (product of TECLOCK CORPORATION). The overall film thickness in each of Examples and Comparative Examples was 10.5±0.5 μm.

(11) Thickness Ratio of Layers

The thickness ratio of layers was calculated from thickness of each layer obtained by measuring, through an optical microscope, the cross-section of a parison prepared upon film formation.

(12) Stretching Ratio

A stretching ratio in the transverse direction is a (film width after stretching)/(parison width before stretching) ratio, while that in the machine direction is a (line velocity after stretching)/(line velocity before stretching) ratio.

(13) Gel Fraction

Mass fraction of an insoluble content after 12 hours treatment in boiling paraxylene was measured in accordance with ASTM-D2765 and it was designated as a gel fraction. As a sample, employed was a film returned to a parison form by heat shrinking the stretched film at 140° C.

(14) Overall Judgment

Based on the results of adhesion work volume, pulling-out power, tear strength, maximum cutting power, modulus in tension, heat shrinkage ratio, heat resistance, film odor, film contamination and bubbling, each film was evaluated synthetically as described below.

| Evaluation Criteria | | Remarks |
|---|---|---|
| A | Evaluations contain A but neither C nor D | Having much excellent performances as a wrap film. |
| B | The number of A and B is at least 6 in total and D is not contained. | Having excellent performances as a wrap film. |
| D | Evaluations contain at least 6 Cs or at least one D. | Film is not equipped with necessary performances as a wrap film and therefore is unsuited. |

Examples 1 to 3, Comparative Example 1, Comparative Example 6

A laminated film made of three layers having a surface layer/intermediate layer/surface layer ratio of 15/70/15 was prepared by the above-described preparation process by using, as each of the surface layers, 50% by weight of "Attaine 4201" (trade name; linear low density polyethylene), 50% by weight of "Petrothene 186R", high pressure process low density polyethylene) and 0.800 part by weight of "Rikemal OL-100E" (trade name; glycerin monofatty acid ester) and, as the intermediate layer, 75% by weight of "Suntec HD S360" (trade name; high density polyethylene), 25% by weight of "Suntec LDM2004" of high pressure process low density polyethylene and 0.800 part by weight of "Rikemal OL-100E" (trade name; glycerin monofatty acid ester) (Example 1). In order to confirm the influence of an additive, the amount of the glycerin monofatty acid ester of each of the surface layers and intermediate layer was changed to 0.500 part by weight (Example 2), 0.300 part by weight (Example 3) and 1.300 part by weight (Comparative Example 1). The additive of each of the surface layers and intermediate layer was changed to 0.500 part by weight of "Acter LO-1" (trade name; glycerin trifatty acid ester) (Comparative Example 6). The data of these films including resin composition are shown in Tables 1 and 5. Evaluation results of these wrap films have revealed that the wrap film of Example 1 was excellent because air bubbles did not remain after heating and properties other than it were also good; the wrap film of each of Examples 2 and 3 was a more excellent wrap film; the film of Comparative Example 1 was not suited as a wrap film because air bubbles remained even after heating; and the wrap film of Comparative Example 6 was not suited because of film contamination. The results are shown in Tables 3 and 6.

Examples 4 and 5, Comparative Examples 2 and 3

In a similar manner to Example 2 except that the resin mixing ratio of the intermediate layer was changed to 90% by weight of high density polyethylene and 10% by weight of high pressure process low density polyethylene, a wrap film was prepared (Example 4). Films were also prepared by changing the ratio of the high density polyethylene/high pressure process low density polyethylene of the intermediate layer to 50/50 (Example 5), 100/0 (Comparative Example 2) and 40/60 (Comparative Example 3). The data of the resulting films including resin composition were shown in Table 1 and Table 5. As a result, it has been found that the wrap films of Examples 4 and 5 satisfied various performances and were therefore excellent wrap films, while those of Comparative Examples 2 and 3 had insufficient modulus in tension. The results are shown in Tables 3 and 6.

Examples 6 to 9, Comparative Examples 4 and 5

A film was prepared in a similar to Example 2 except that a resin mixing ratio of the surface layer was changed to 85% by weight of linear low density polyethylene and 15% by weight of high pressure process low density polyethylene (Example 6). Films were also prepared by changing a linear low density polyethylene/high pressure process low density polyethylene ratio of each of the surface layers to 75/25 (Example 7), 60/40 (Example 8), 40/60 (Example 9), 100/0 (Comparative Example 4) and 15/85 (Comparative Example 5). The data of the resulting films including resin composition are shown in Tables 1 and 5. These results have revealed that the film obtained in Example 6 was an excellent wrap film; the films obtained in Examples 7 to 9 satisfied various properties necessary as a wrap film and therefore were much excellent wrap film; and the films obtained in Comparative Examples 4 and 5 were not sufficient in adhesion work volume and pulling-out power which are important properties of a wrap film. The results are shown in Tables 3 and 6.

Examples 10 to 12, Comparative Examples 7 to 8

In a similar manner to Example 1 except that the composition of the surface layer was changed to 70% by weight of a linear low density polyethylene ("Sumikathene Hi-α FW201-0", trade name), 30% by weight of high pressure process low density polyethylene ("Petrothene 6KO2A", trade name) and 0.800 part by weight of glycerin monofatty acid ester ("Rikemal OL-100E", trade name), a film was prepared (Example 10). In order to confirm the influence of an additive, the amount of the glycerin monofatty acid ester of each of the surface layers and intermediate layer was changed to 0.500 part by weight (Example 11), 0.300 part by weight (Example 12) and 1.300 parts by weight (Comparative Example 7), whereby films were prepared, respectively. By changing the additive of each of the surface layers and intermediate layer to 0.500 part by weight of glycerin trifatty acid ester ("Acter LO-1", trade name), a film was prepared (Comparative Example 8). The data of the resulting films including resin composition are shown in Tables 2 and 5. Evaluation results of these wrap films have revealed that the wrap film of Example 10 was excellent, the wrap films of Examples 11 and 12 were superior to it; the film of Comparative Example 7 was not suited as a wrap film because air bubbles remained even after heating; and the wrap film of Comparative Example 8 was not suited because film contamination occurred. The results are shown in Tables 4 and 6.

Examples 13 and 14

In a similar manner to Example 2 except that the composition of the each of the surface layers was changed to 90% by weight of a linear low density polyethylene ("Moretec 0238CN", trade name), 10% by weight of high pressure process low density polyethylene ("Petrothene 6K02A", trade name) and 0.500 part by weight of a glycerin monofatty acid ester ("Rikemal OL-100E", trade name), a film was prepared (Example 13). By changing a linear low density polyethylene/high pressure process low density polyethylene ratio from the above-described one to 75/25, a film was prepared (Example 14). The data of the films including resin compositions are shown in Table 2. The results have revealed that the film obtained in Example 13 was an-excellent wrap film and that obtained in Example 14 was superior thereto. The results are shown in Table 4.

Example 15

In a similar manner to Example 2 except that the composition of the surface layer resin was changed to 90% by weight of a linear low density polyethylene ("Umerit 1520F", trade name), 10% by weight of a high pressure process low density polyethylene ("Petrothene 6K02A", trade name) and 0.500 part by weight of glycerin monofatty acid ester ("Rikemal OL-100E", trade name), a film was prepared. The The data of the film including resin composition were shown in Table 2. The results have revealed that it had excellent performances as a wrap film. The results are shown in Table 4.

Examples 16, Comparative Examples 9 and 10

In a similar manner to Example 2 except that the thickness ratio of each layer was changed to surface layer/intermediate layer/surface layer=30/40/30, a film was prepared (Example 16). Films having three layers at a thickness ratio of 2/96/2 (Comparative Example 9) and 40/20/40 (Comparative Example 10) were also prepared, respectively. The data of the resulting films including resin composition were shown in Tables 2 and 5. The results have revealed that the film obtained in Example 16 had much excellent performances as a wrap film; difficulty in thickness control prevented film formation in Comparative Example 9; and the film obtained in Comparative Example 10 had not sufficient modulus in tension. The results are shown in Tables 4 and 6.

Example 17

In a similar manner to Example 9 except that the resin composition of the intermediate layer was changed to 73% by weight of high density polyethylene ("Moretec 0408G", trade name), 27% by weight of high pressure process low density polyethylene ("Suntec LD M2004", trade name) and 0.500 part by weight of glycerin monofatty acid ester ("Rikemal OL-100E", trade name), a film was prepared. The data of the wrap film including resin composition were shown in Table 2. The evaluation results of the film have revealed that it had much excellent performances as a wrap film. The results are shown in Table 4.

Example 18

In a similar manner to Example 17 except that the resin composition of the intermediate layer was changed to 73% by weight of high density polyethylene (" Nipolon Hard 2500", trade name), 27% by weight of high pressure process low density polyethylene ("Suntec LD M2004", trade name) and 0.500 part by weight of glycerin monofatty acid ester ("Rikemal OL-100E", trade name), a film was prepared. The data of the wrap film including resin composition were shown in Table 2. The evaluation results of the film have revealed that it had much excellent performances as a wrap film. The results are shown in Table 4.

Example 19

In a similar manner to Example 17 except that the resin composition of the intermediate layer was changed to 73% by weight of high density polyethylene (" Nipolon Hard 2000", trade name), 27% by weight of high pressure process low density polyethylene ("Suntec LD M2004", trade name) and 0.500 part by weight of glycerin monofatty acid ester ("Rikemal OL-100E", trade name), a film was prepared. The data of the wrap film including resin composition were shown in Table 2. The evaluation results of the film have revealed that it had excellent performances as a wrap film. The results are shown in Table 4.

Examples 20 to 22

The maximum cutting power when each of the films obtained in Example 2 (Example 20), Example 15 (Example 21) and Example 17 (Example 22) was cut using a linear cutter or arched cutter was evaluated. The results have revealed that power necessary for cutting was smaller when the arched cutter was used than when the linear cutter was used. The results are shown in Table 7.

According to Examples and Comparative Examples, it has been understood that the crosslinked laminated films of the invention have good balance between adhesion and pulling-out property, can be cut with small power, have elastic touch feel, low odor emission and excellent heat resistance, do not leave air bubbles even after heating in a microwave oven, have resilience, have good appearance when used for wrapping, and can be produced efficiently. It has also been found that the films of the invention exhibit good cutting property when an arched cutter is used.

TABLE 1

|  |  |  |  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|---|
| Thickness ratio of three layers (surface layer/intermediate layer/surface layer) | | | | | 15/70/15 | 15/70/15 | 15/70/15 | 15/70/15 | 15/70/15 | 15/70/15 | 15/70/15 | 15/70/15 | 15/70/15 |
| Stretching ratio machine direction × transverse direction (times) | | | | | 6 × 6 | 6 × 6 | 6 × 6 | 6 × 6 | 6 × 6 | 6 × 6 | 6 × 6 | 6 × 6 | 6 × 6 |
| Gel fraction (% by weight) | | | | | 20 to 50 | 20 to 50 | 20 to 50 | 20 to 50 | 20 to 50 | 20 to 50 | 20 to 50 | 20 to 50 | 20 to 50 |
| Surface layer | Resin | % by weight | LL1 | Attaine 4201 | 50 | 50 | 50 | 50 | 50 | 85 | 75 | 60 | 40 |
| | | | LL2 | Sumikathene FW201-O | | | | | | | | | |
| | | | LL3 | Moretec 0238CN | | | | | | | | | |
| | | | LL4 | Umerit 1520F | | | | | | | | | |
| | | | LD1 | Petrothene 186R | 50 | 50 | 50 | 50 | 50 | 15 | 25 | 40 | 60 |
| | | | LD2 | Petrothene 6K02A | | | | | | | | | |
| | Additive | Part by weight | GMO | Rikemal OL-100E | 0.800 | 0.500 | 0.300 | 0.500 | 0.500 | 0.500 | 0.500 | 0.500 | 0.500 |
| | | | | Glycerin monofatty acid ester | 0.784 | 0.490 | 0.294 | 0.490 | 0.490 | 0.490 | 0.490 | 0.490 | 0.490 |
| | | | | Glycerin monooleate | 0.588 | 0.368 | 0.221 | 0.368 | 0.368 | 0.368 | 0.368 | 0.368 | 0.368 |
| Intermediate layer | Resin | % by weight | HD1 | Suntec HD S360 | 75 | 75 | 75 | 90 | 50 | 75 | 75 | 75 | 75 |
| | | | LD3 | Suntec LD M2004 | 25 | 25 | 25 | 10 | 50 | 25 | 25 | 25 | 25 |
| | Additive | Part by weight | GMO | Rikemal OL-100E | 0.800 | 0.500 | 0.300 | 0.500 | 0.500 | 0.500 | 0.500 | 0.500 | 0.500 |
| | | | | Glycerin monofatty acid ester | 0.784 | 0.490 | 0.294 | 0.490 | 0.490 | 0.490 | 0.490 | 0.490 | 0.490 |
| | | | | Glycerin monooleate | 0.588 | 0.368 | 0.221 | 0.368 | 0.368 | 0.368 | 0.368 | 0.368 | 0.368 |

Note 1: Each numeral in the column of "glycerin monofatty acid ester" in Table 1 is a product obtained multiplying a numeral in the column of "Rikemal OL-100E" by its content, 0.98.
Note 2: Each numeral in the column of "glycerin monooleate" In Table 1 is a product obtained multiplying a numeral in the column of "Rikemal OL-100E" by its content, 0.735.

TABLE 2

|  |  |  |  |  | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|---|---|
| Thickness ratio of three layers (surface layer/intermediate layer/surface layer) | | | | | 15/70/15 | 15/70/15 | 15/70/15 | 15/70/15 | 30/40/30 | 15/70/15 | 15/70/15 | 15/70/15 | 15/70/15 | 15/70/15 |
| Stretching ratio machine direction × transverse direction (times) | | | | | 6 × 6 | 6 × 6 | 6 × 6 | 6 × 6 | 6 × 6 | 6 × 6 | 6 × 6 | 6 × 6 | 6 × 6 | 6 × 6 |
| Gel fraction (% by weight) | | | | | 20 to 50 | 20 to 50 | 20 to 50 | 20 to 50 | 20 to 50 | 20 to 50 | 20 to 50 | 20 to 50 | 20 to 50 | 20 to 50 |
| Surface layer | Resin | % by weight | LL1 | Attaine 4201 | | | | | | | 50 | 40 | 40 | 40 |
| | | | LL2 | Sumikathene FW201-O | 70 | 70 | 70 | | | | | | | |
| | | | LL3 | Moretec 0238CN | | | | 90 | 75 | | | | | |
| | | | LL4 | Umerit 1520F | | | | | | 90 | | | | |
| | | | LD1 | Petrothene 186R | | | | | | | 50 | 60 | 60 | 60 |
| | | | LD2 | Petrothene 6K02A | 30 | 30 | 30 | 10 | 25 | 10 | | | | |
| | Additive | Part by weight | GMO | Rikemal OL-100E | 0.800 | 0.500 | 0.300 | 0.500 | 0.500 | 0.500 | 0.500 | 0.500 | 0.500 | 0.500 |
| | | | | Glycerin monofatty acid ester | 0.784 | 0.490 | 0.294 | 0.490 | 0.490 | 0.490 | 0.490 | 0.490 | 0.490 | 0.490 |
| | | | | Glycerin monooleate | 0.588 | 0.368 | 0.221 | 0.368 | 0.368 | 0.368 | 0.368 | 0.368 | 0.368 | 0.368 |
| Intermediate layer | Resin | % by weight | HD1 | Suntec HD S360 | 75 | 75 | 75 | 75 | 75 | 75 | 75 | | | |
| | | | HD2 | Moretec 0408G | | | | | | | | 73 | | |
| | | | HD3 | Nipolon Hard 2500 | | | | | | | | | 73 | |
| | | | HD4 | Nipolon Hard 2000 | | | | | | | | | | 73 |
| | | | LD3 | Suntec LD M2004 | 25 | 25 | 25 | 25 | 25 | 25 | 25 | 27 | 27 | 27 |
| | Additive | Part by Weight | GMO | Rikemal OL-100E | 0.800 | 0.500 | 0.300 | 0.500 | 0.500 | 0.500 | 0.500 | 0.500 | 0.500 | 0.500 |
| | | | | Glycerin monofatty acid ester | 0.784 | 0.490 | 0.294 | 0.490 | 0.490 | 0.490 | 0.490 | 0.490 | 0.490 | 0.490 |
| | | | | Glycerin monooleate | 0.588 | 0.368 | 0.221 | 0.368 | 0.368 | 0.368 | 0.368 | 0.368 | 0.368 | 0.368 |

Note 1: Each numeral in the column of "glycerin monofatty acid ester" in Table 1 is a product obtained multiplying a numeral in the column of "Rikemal OL-100E" by its content, 0.98.
Note 2: Each numeral in the column of "glycerin monooleate" In Table 1 is a product obtained multiplying a numeral in the column of "Rikemal OL-100E" by its content, 0.735.

TABLE 3

| | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Evaluation results | Adhesion work volume | A | A | A | A | A | A | A | A | A |
| | Pulling-out power | A | A | A | A | A | C | B | A | A |
| | Tear strength | B | B | B | B | B | B | B | B | B |
| | Modulus in tension | B | B | B | C | C | B | B | B | B |
| | Heat shrinkage ratio | B | B | B | B | B | B | B | B | B |
| | Heat resistance | B | B | B | B | B | B | B | B | B |
| | Odor emission from film | B | B | B | B | B | B | B | B | B |
| | Film contamination | B | B | B | B | B | B | B | B | B |
| | Bubbling | C | B | B | B | B | B | B | B | B |
| | Overall judgment | B | A | A | B | B | B | A | A | A |

TABLE 4

| | | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|
| Evaluation results | Adhesion work volume | A | A | A | A | B | B | A | A | A | A |
| | Pulling-out power | A | A | A | C | A | B | A | A | A | A |
| | Tear strength | B | B | B | B | B | B | B | B | B | CD |
| | Modulus in tension | B | B | B | B | B | B | B | B | B | B |
| | Heat shrinkage ratio | B | B | B | B | B | B | B | B | B | B |
| | Heat resistance | B | B | B | B | B | B | B | B | B | B |
| | Odor emission from film | B | B | B | B | B | B | B | B | B | B |
| | Film contamination | B | B | B | B | B | B | B | B | B | B |
| | Bubbling | C | B | B | B | B | B | B | B | B | B |
| | Overall judgment | B | A | A | B | A | B | A | A | A | C |

TABLE 5

| | | | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|---|---|---|
| Thickness ratio of three layers (surface layer/intermediate layer/surface layer) | | | | | 15/70/15 | 15/70/15 | 15/70/15 | 15/70/15 | 15/70/15 | 15/70/15 | 15/70/15 | 15/70/15 | 2/96/2 | 40/20/40 |
| Stretching ratio machine direction x transverse direction (times) | | | | | 6 × 6 | 6 × 6 | 6 × 6 | 6 × 6 | 6 × 6 | 6 × 6 | 6 × 6 | 6 × 6 | — | 6 × 6 |
| Gel fraction (% by weight) | | | | | 20 to 50 | 20 to 50 | 20 to 50 | 20 to 50 | 20 to 50 | 20 to 50 | 20 to 50 | 20 to 50 | 20 to 50 | 20 to 50 |
| Surface layer | Resin | % by weight | LL1 | Attaine 4201 | 50 | 50 | 50 | 100 | 15 | 50 | | | 50 | 50 |
| | | | LL2 | Sumikathene FW201-O | | | | | | | 70 | 70 | | |
| | | | LL3 | Moretec 0238CN | | | | | | | | | | |
| | | | LL4 | Umerit 1520F | | | | | | | | | | |
| | | | LD1 | Petrothene 186R | 50 | 50 | 50 | — | 85 | 50 | | | 50 | 50 |
| | | | LD2 | Petrothene 6K02A | | | | | | | 30 | 30 | | |
| | Additive | Part by weight | GMO | Rikemal OL-100E | 1.300 | 0.500 | 0.500 | 0.500 | 0.500 | | 1.300 | | 0.500 | 0.500 |
| | | | | Glycerin mono-fatty acid ester | 1.274 | 0.490 | 0.490 | 0.490 | 0.490 | | 1.274 | | 0.490 | 0.490 |
| | | | | Glycerin monooleate | 0.956 | 0.368 | 0.368 | 0.368 | 0.368 | | 0.956 | | 0.368 | 0.368 |
| | | | GTO | "Acter LO-1" | | | | | | 0.500 | | 0.500 | | |
| | | | | Glycerin mono-fatty acid ester | | | | | | 0.500 | | 0.500 | | |
| | | | | Glycerin trioleate | | | | | | 0.475 | | 0.475 | | |
| Intermediate layer | Resin | % by weight | HD1 | Suntec HD S360 | 75 | 100 | 40 | 75 | 75 | 75 | 75 | 75 | 75 | 75 |
| | | | LD3 | Suntec LD M2004 | 25 | — | 60 | 25 | 25 | 25 | 25 | 25 | 25 | 25 |
| | Additive | Part by weight | GMO | Rikemal OL-100E | 1.300 | 0.500 | 0.500 | 0.500 | 0.500 | | 1.300 | | 0.500 | 0.500 |
| | | | | Glycerin mono-fatty acid ester | 1.274 | 0.490 | 0.490 | 0.490 | 0.490 | | 1.274 | | 0.490 | 0.490 |
| | | | | Glycerin monooleate | 0.956 | 0.368 | 0.368 | 0.368 | 0.368 | | 0.956 | | 0.368 | 0.368 |
| | | | GTO | "Acter LO-1" | | | | | | 0.500 | | 0.500 | | |
| | | | | Glycerin mono- | | | | | | 0.500 | | 0.500 | | |

TABLE 5-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| fatty acid ester Glycerin trioleate |  |  |  |  |  | 0.475 |  | 0.475 |  |  |

Note 1: Each numeral in the column of "glycerin monofatty acid ester" in Table 5 is a product obtained multiplying a numeral in the column of "Rikemal OL-100E" by its content, 0.98.
Note 2: Each numeral in the column of "glycerin monooleate" in Table 5 is a product obtained multiplying a numeral in the column of "Rikemal OL-100E" by its content, 0.735.
Note 3: Each numeral in the column of "glycerin trifatty acid ester" in Table 5 is a product obtained multiplying a numeral in the column of "Acter LO-1" by its content, 1.00.
Note 4: Each numeral in the column of "glycerin trioleate" in Table 5 is a product obtained multiplying a numeral in the column of "Acter LO-11" by its content, 1.00.

TABLE 6

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|
| Evaluation results | Adhesion work volume | A | B | A | A | D | A | A | A | — | A |
|  | Pulling-out power | A | A | A | D | A | A | A | A | — | B |
|  | Tear strength | B | B | B | B | B | B | B | B | — | B |
|  | Modulus in tension | B | D | D | B | B | B | B | B | — | D |
|  | Heat shrinkage ratio | B | B | B | B | B | B | B | B | — | B |
|  | Heat resistance | B | B | B | B | B | B | B | B | — | B |
|  | Film odor | B | B | B | B | B | B | B | B | — | B |
|  | Film contamination | B | B | B | B | B | D | B | D | — | B |
|  | Bubbling | D | B | B | B | B | B | D | B | — | B |
|  | Overall judgment | D | D | D | D | D | D | D | D | — | D |

TABLE 7

|  |  | Cutter |  |
|---|---|---|---|
| Film |  | Arched cutter | Linear cutter |
| Ex. 20 | Film of Ex. 2 | B | C |
| Ex. 21 | Film of Ex. 15 | B | C |
| Ex. 22 | Film of Ex. 17 | B | C |

The crosslinked laminated wrap films of the invention are excellent in adhesion, pulling-out property from a dispenser box, cutting property, heat resistance, low odor emission and touch feel, suffer from less film contamination upon film production, and is capable of suitably wrapping foods.

While the invention has been described in detail and with reference to specific examples thereof, it will be apparent to one skilled in the art that various changes and modifications can be made therein without departing from the spirit and scope thereof.

What is claimed is:

1. A crosslinked laminated wrap film having, at least, two surface layers and one intermediate layer,
   wherein the two surface layers each comprises 20 to 90% by weight of a linear low density polyethylene and 80 to 10% by weight of a high pressure process low density polyethylene,
   wherein the intermediate layer has at least one layer comprising 50 to 95% by weight of a high density polyethylene and 50 to 5% by weight of a high pressure process low density polyethylene, and
   wherein the surface layers and intermediate layer each has 0.050 to 0.800 part by weight of glycerin monofatty acid ester based on 100 parts by weight in total of the two polyethylenes constituting the respective layer.

2. The crosslinked laminated wrap film of claim 1, wherein the surface layers each comprises 30 to 80% by weight of the linear low density polyethylene and 70 to 20% by weight of the high pressure process low density polyethylene.

3. The crosslinked laminated wrap film of claim 1, wherein the surface layers each comprises 30 to 70% by weight of the linear low density polyethylene and 70 to 30% by weight of the high pressure process low density polyethylene.

4. The crosslinked laminated wrap film of claim 1, wherein the linear low density polyethylene has a density of 0.900 to 0.929 g/cm$^3$.

5. The crosslinked laminated wrap film of claim 1, wherein the high pressure process low density polyethylene has a density of 0.910 to 0.939 g/cm$^3$.

6. The crosslinked laminated wrap film of claim 1, wherein the high density polyethylene has a density of 0.940 to 0.975 g/cm$^3$.

7. The crosslinked laminated wrap film of claim 1, wherein the high density polyethylene has a melt index of 0.1 to 10.0 g/10 min.

8. The crosslinked laminated wrap film of claim 1, wherein the high density polyethylene has a melt index of 0.1 to 3.9 g/10 min.

9. The crosslinked laminated wrap film of claim 1, which has a gel fraction of 20 to 70% by weight.

10. The crosslinked laminated wrap film of claim 4, which has been subjected to biaxial stretching.

11. The crosslinked laminated wrap film of claim 1, wherein relative to the overall film thickness of the crosslinked laminated wrap film, a thickness ratio of the total of the surface layers is 70 to 10% and that of the intermediate layer is 30 to 90%.

12. The crosslinked laminated wrap film of claim 10, which has the overall film thickness of 5 to 25 μm.

13. The crosslinked laminated wrap film of claim 12, wherein the glycerin monofatty acid ester content of each of said layers is 0.050 to 0.500 part by weight based on 100 parts by weight of the resin amount of the respective layer.

14. The crosslinked laminated wrap film of claim 1, wherein the glycerin monofatty acid ester content of each of said layer is 0.100 to 0.300 part by weight based on 100 parts by weight of the resin amount of the respective layer.

15. The crosslinked laminated wrap film of claim 1, wherein the fatty acid ester moiety of the glycerin monofatty acid ester has 6 to 20 carbon atoms.

16. The crosslinked laminated wrap film of claim 1, wherein the fatty acid ester moiety of the glycerin monofatty acid ester is at least one ester selected from stearic acid esters and oleic acid esters.

17. The crosslinked laminated wrap film of claim 13, wherein the fatty acid ester moiety of the glycerin monofatty acid ester is an oleic acid ester.

18. The crosslinked laminated wrap film of claim 1, wherein a difference in the glycerin monofatty acid ester content based on 100 parts by weight of the resin amount of the respective layer among the two surface layers and intermediate layer is 0 to 0.300 part by weight.

19. The crosslinked laminated wrap film of any one of claims 1 to 18, which has an adhesion work volume of 0.50 to 3.50 mJ and a pulling-out power of 50 to 1000 mN.

20. A dispenser box equipped with a cutter extending its longitudinal direction and having a crosslinked laminated wrap film of claim 1 placed therein, wherein the cutter is set such that a central portion thereof in the longitudinal direction is linear and the cutter gradually inclines to a direction of a bottom line of the box sequentially toward both ends of the cutter, and the both endmost portions protrude toward the bottom line direction of the box by 2 to 15 mm relative to the central portion.

* * * * *